June 12, 1934.     G. A. BIGGS     1,962,383
HYDRAULIC TURBINE
Filed Dec. 15, 1932     9 Sheets-Sheet 1

INVENTOR
GEORGE A. BIGGS.
BY
ATTORNEYS

INVENTOR
GEORGE A. BIGGS.
BY
ATTORNEYS

June 12, 1934.                G. A. BIGGS                1,962,383
                            HYDRAULIC TURBINE
                         Filed Dec. 15, 1932          9 Sheets-Sheet 4

INVENTOR
GEORGE A. BIGGS.
BY
ATTORNEYS

June 12, 1934.　　　　G. A. BIGGS　　　　1,962,383

HYDRAULIC TURBINE

Filed Dec. 15, 1932　　　9 Sheets-Sheet 5

INVENTOR
GEORGE A. BIGGS.
BY
ATTORNEYS

June 12, 1934.  G. A. BIGGS  1,962,383
HYDRAULIC TURBINE
Filed Dec. 15, 1932  9 Sheets-Sheet 6

INVENTOR
GEORGE A. BIGGS.
BY
ATTORNEYS

June 12, 1934.  G. A. BIGGS  1,962,383
HYDRAULIC TURBINE
Filed Dec. 15, 1932   9 Sheets-Sheet 7
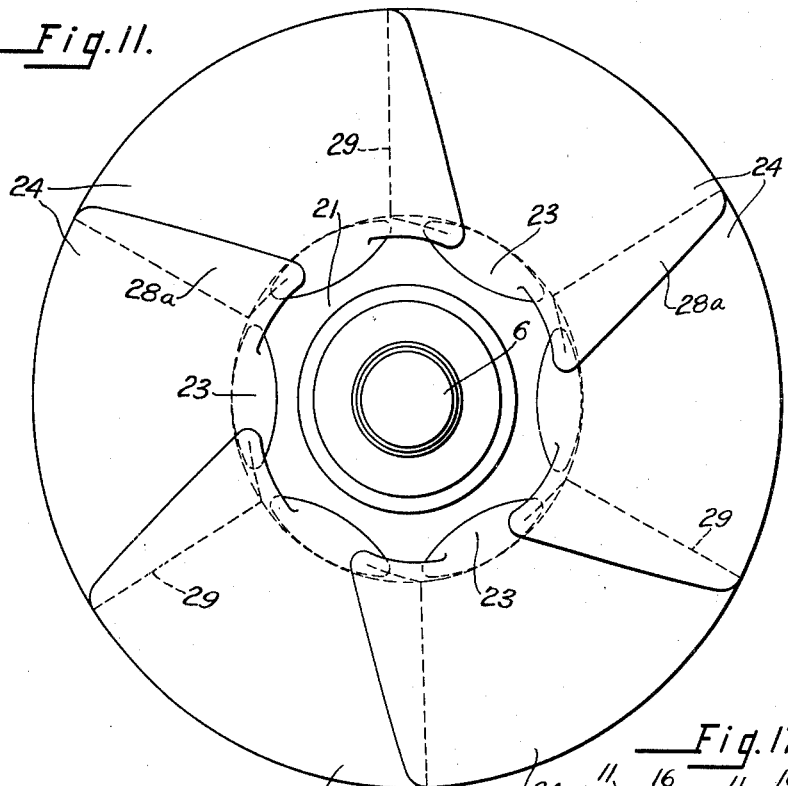
Fig.11.
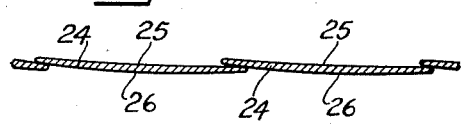
Fig.16.
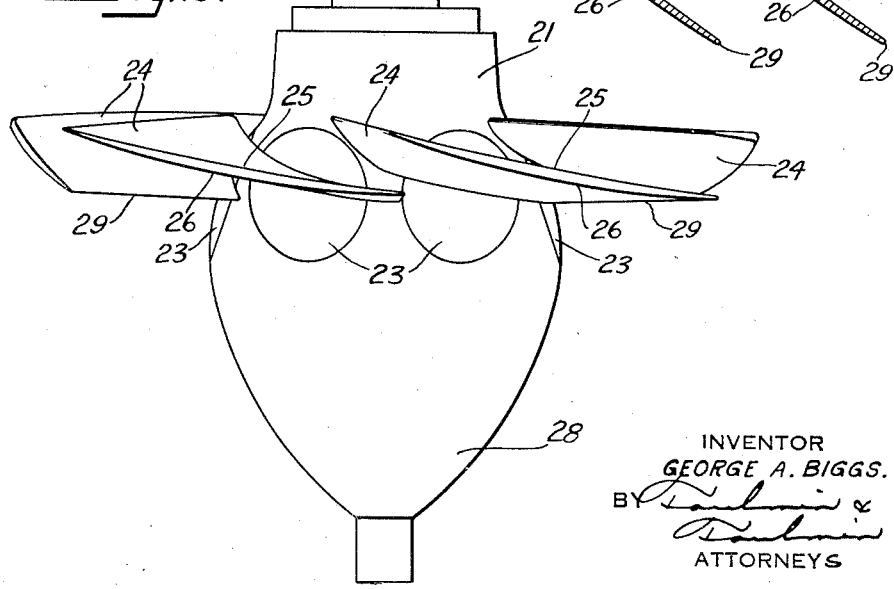
Fig.17.
Fig.10.
INVENTOR
GEORGE A. BIGGS.
BY
ATTORNEYS June 12, 1934.　　　G. A. BIGGS　　　1,962,383
HYDRAULIC TURBINE
Filed Dec. 15, 1932　　　9 Sheets-Sheet 8

INVENTOR
GEORGE A. BIGGS.
BY
ATTORNEYS

June 12, 1934.  G. A. BIGGS  1,962,383
HYDRAULIC TURBINE
Filed Dec. 15, 1932  9 Sheets-Sheet 9
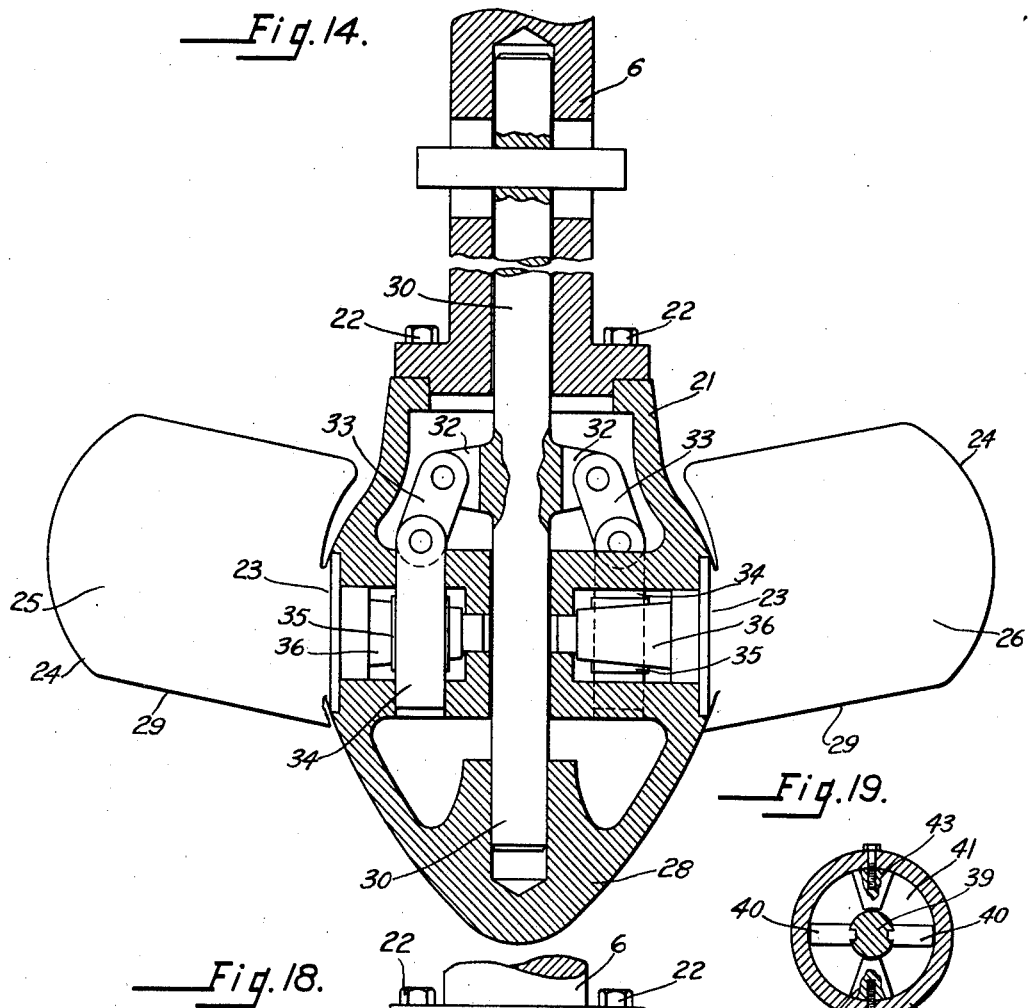
Fig. 14.
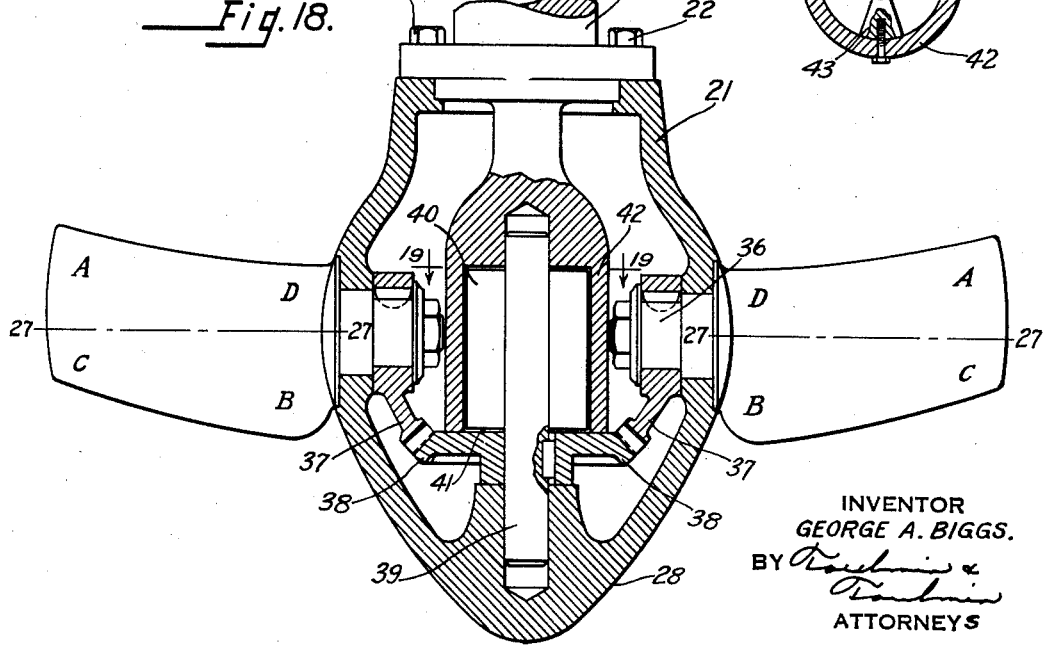
Fig. 18.
Fig. 19.
INVENTOR
GEORGE A. BIGGS.
BY
ATTORNEYS Patented June 12, 1934

1,962,383

UNITED STATES PATENT OFFICE 1,962,383

HYDRAULIC TURBINE

George A. Biggs, Springfield, Ohio, assignor to
The James Leffel & Company, Springfield,
Ohio, a corporation of Ohio Application December 15, 1932, Serial No. 647,354

17 Claims. (Cl. 253—148)

My invention relates to hydraulic turbines and, in particular, to a hydraulic turbine with adjustable runner blades or buckets adapted to cut off the flow of water between the buckets and through the gate casing without the use of gates for controlling the water.

It is an object to provide a hydraulic turbine having self-adjusting buckets.

It is a further object to provide buckets concave on top and convex on the bottom and particularly buckets engaging one another when in closed position along straight lines.

It is a further object to provide buckets having their axes either horizontal or directed upwardly above the horizontal plane, which plane is at right angles to the major axis of the runner.

It is a further object to provide the axes of the buckets and the axes of the guide vanes substantially in parallelism.

It is my object to provide a plurality of guide vanes substantially overlapping when viewed from either the top or bottom thereof, the leading edges of which and the trailing edges of which are arranged of lines substantially tangential to the hub thereof and at an angle to radial lines passing through the axis thereof.

It is an object to provide a ring having a hub interconnected with the ring by a plurality of overlapping blades, the hub and interior of the ring being arranged to guide the water in a vertical path along the axis of the turbine runner arranged therebelow.

It is a further object to arrange the interconnecting blades in arcuate paths overlapping one another with outwardly converging trailing and leading edges for guiding the water downwardly on to the runner buckets therebelow.

In particular, it is my object to provide a hydraulic turbine in which the water accumulates above the vanes and moves downwardly in an axial direction only thereby eliminating all radial movement of the water and all combined radial and whirling components.

In particular, it is my object to eliminate all gates, particularly gates of the conventional type arranged vertically.

Referring to the drawings:

Figure 10 is a side elevation of a modified form of runner, the axes of whose buckets are horizontal;

Figure 11 is a top plan view thereof;

Figure 14 is a section through a modified form of runner in which the blades are remotely adjustable;

Figure 16 is a section on the line 16—16 of Figure 5;

Figure 17 is a section on the line 17—17 of Figure 4;

Figure 18 is a section through a self-adjusting form of runner;

Figure 19 is a section on the line 19—19 of Figure 18.

Figure 1:
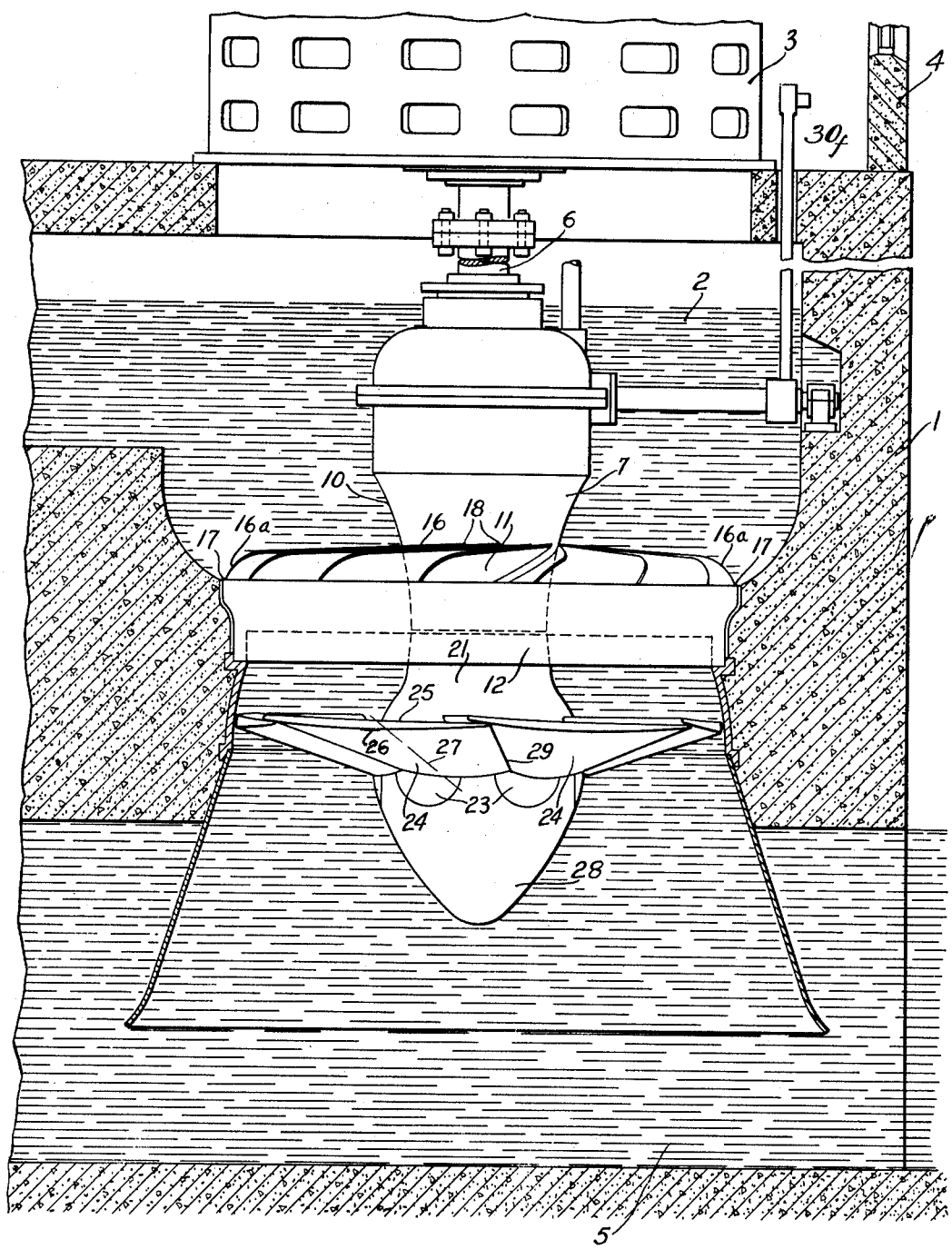
Figure 1 is a side elevation, with the draft tube in section, of the guide vanes and runner with the runner buckets closed.

Referring to the drawings in detail, 1 indicates the concrete forming the draft tube containing the head waters 2. Mounted upon the concrete draft tube 1 is the generator 3 located within the power house walls 4. 5 designates the tail waters which are discharged from the draft tube 1 to a point below the runner. The generator 3 has connected thereto the runner shaft 6 which operates the generator. Mounted on this shaft and upon the draft tube 1 is a substantially horizontally disposed guide vane mechanism comprising a hub 7 having an interior chamber 8 for receiving a bearing 9 surrounding the shaft 6. The exterior of this hub converges inwardly and downwardly having an arcuate surface 10.

Extending from this arcuate surface substantially horizontally are a plurality of arcuate guide vanes 11. The outer ends of these guide vanes are mounted on a ring 12 supported by the draft tube 1. The inner surface of this ring is arcuate, the walls thereof converging inwardly and downwardly as at 13 and in substantial parallelism with the surface 10 of the hub. This ring is preferably stationary.

It will be noted that the guide vanes 11 have their convex surfaces disposed upwardly and their concave surfaces disposed downwardly as at 14 and 15.

The entering or leading edge of each vane designated 16 is disposed on a line that is substantially tangential to the hub and is disposed at an angle to a radial line passing from the center of the hub outwardly. This leading edge 16 is directed with its outer end 17 advanced over the point of departure at 18 from the hub or inclined in a clockwise direction while the trailing edge 19 converges outwardly towards the edge 16 and, therefore, is inclined from the hub outwardly in an anti-clockwise direction.

It will be noted that the guide vanes overlap substantially one-half of their radial length but only a portion of their surfaces actually overlap when viewed from above, such as the area 20.

The result of this arrangement is that the head waters 2 pass downwardly always in a generally axial path and are not subjected to any radial movement. They are not controlled by any gate mechanism such as conventionally known. The water so passing axially is directed between the guide vanes into a vertical plane as shown in Figure 17 where it impinges substantially at right angles to the surfaces of the runner buckets.

It should be further noted that the trailing edges 19 are substantially horizontal while the leading edges 16 are horizontal throughout their major length turning over at their ends as at 16a, the blades 11 extending above the top of the ring 12.

Figure 2:
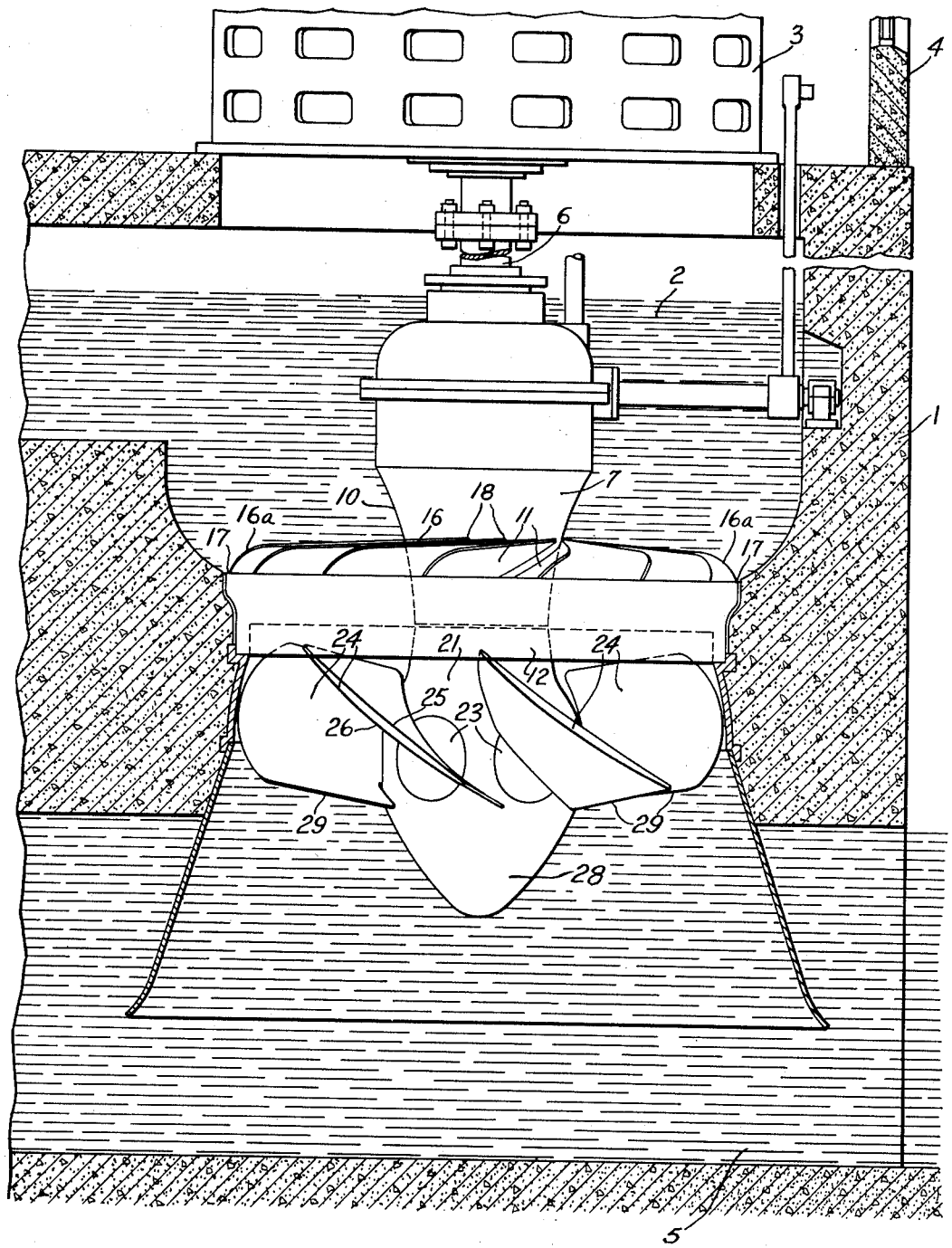
Figure 2 is a similar view with the runner buckets open.
Figure 3:
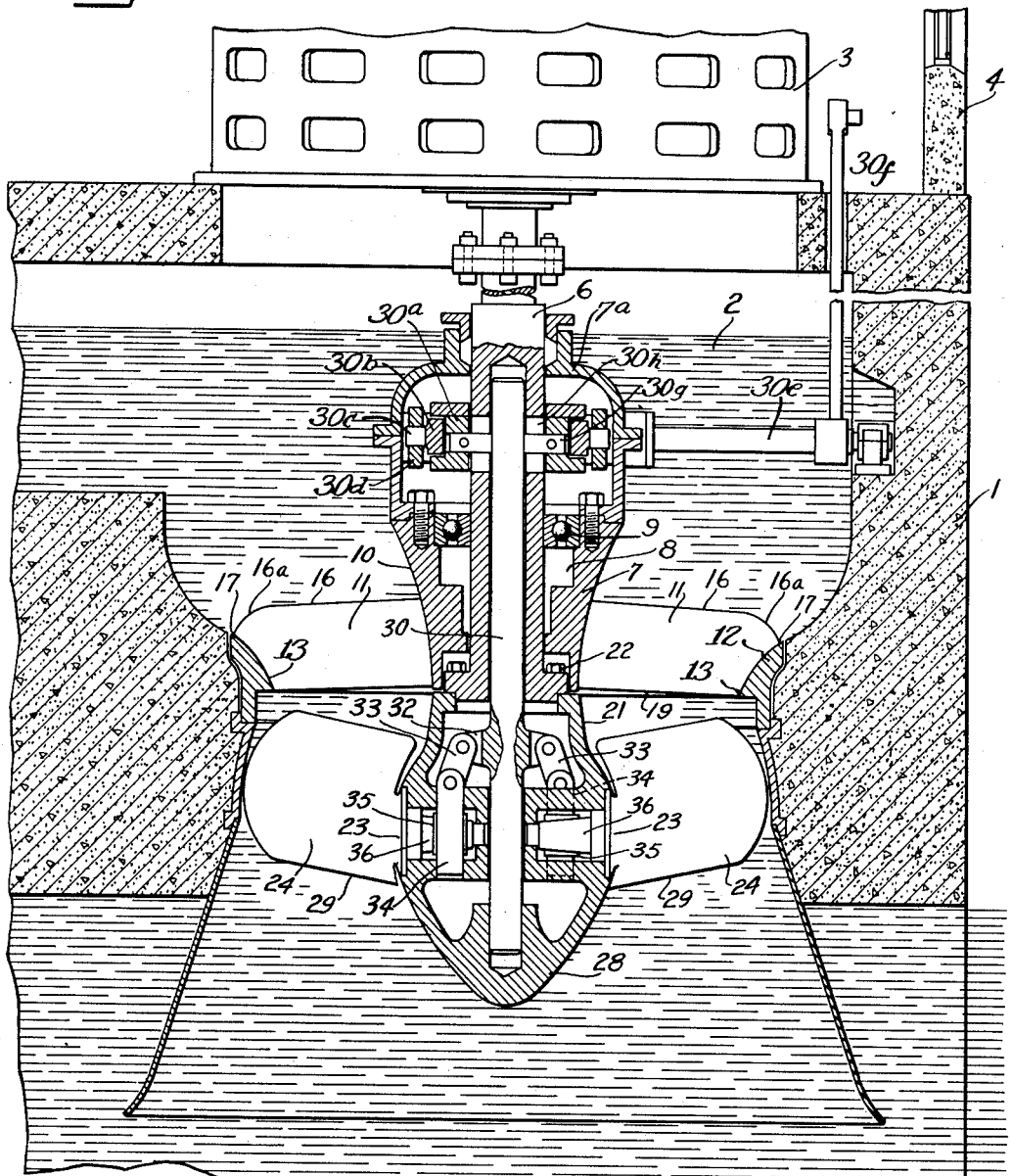
Figure 3 is a section taken vertically through Figure 2.
Figure 15:
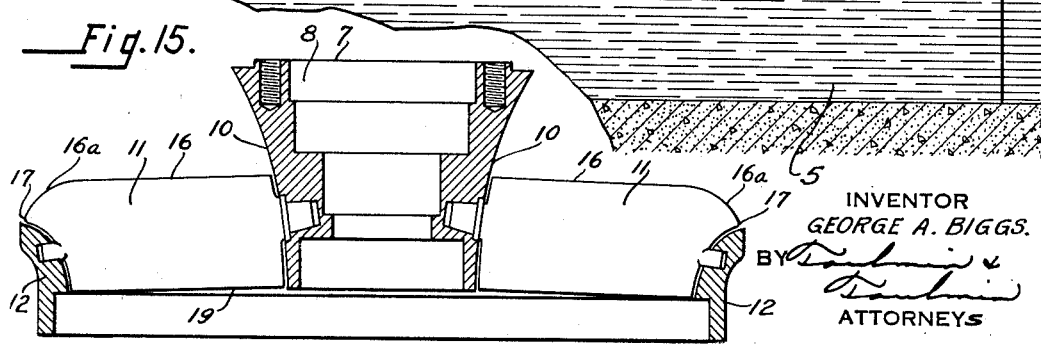
Figure 15 is a section through the guide vanes showing the vanes when made adjustable.
Figure 4:
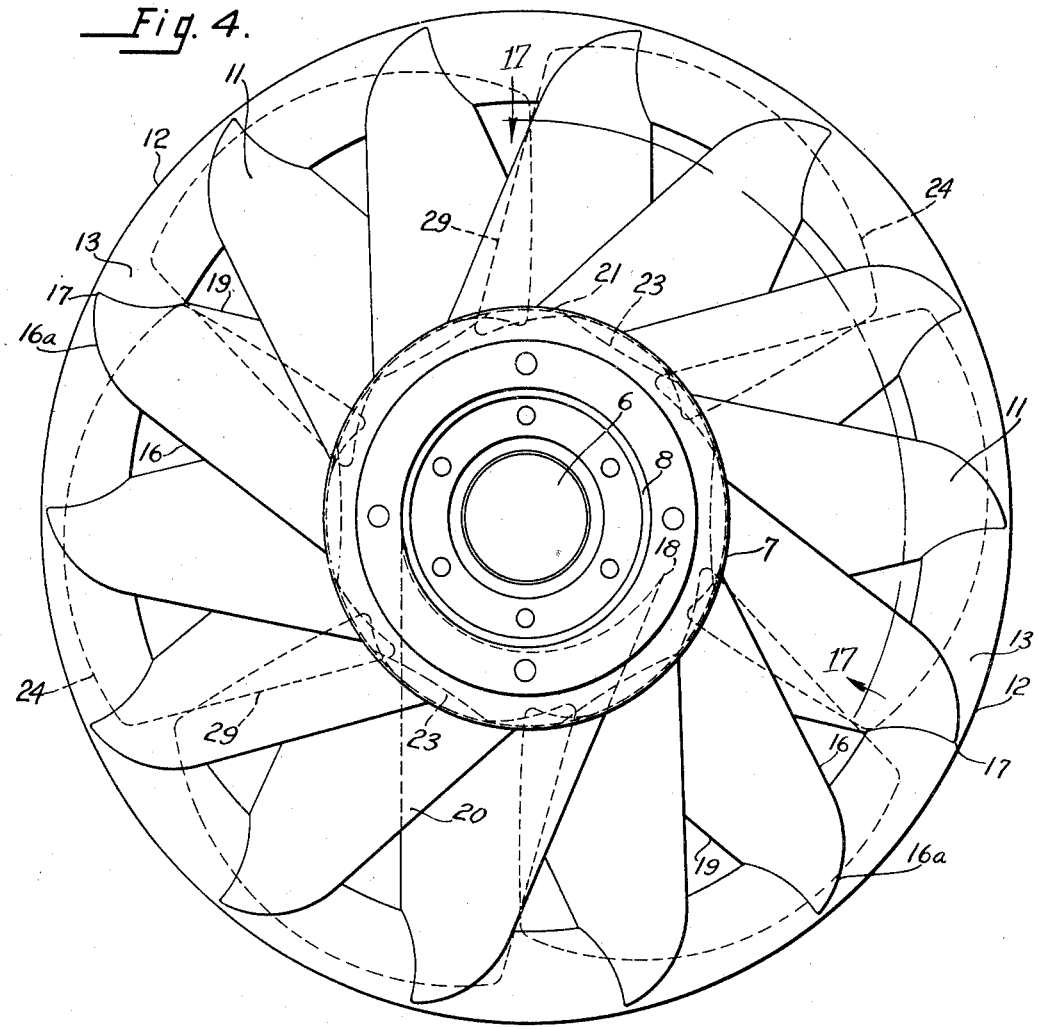
Figure 4 is a top plan view of the runner and the stationary guide vanes.
Figure 7:
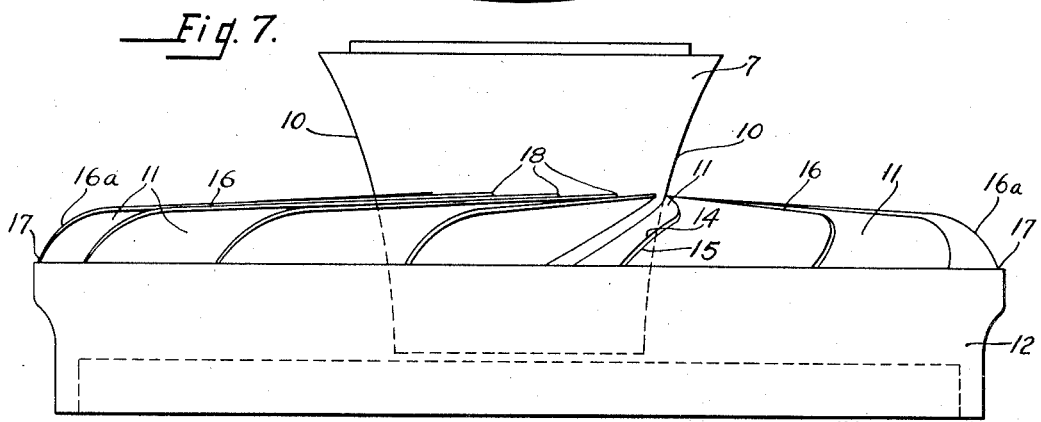
Figure 7 is a detail side elevation of the stationary guide vanes with the ring and hub thereof.
Figure 5:
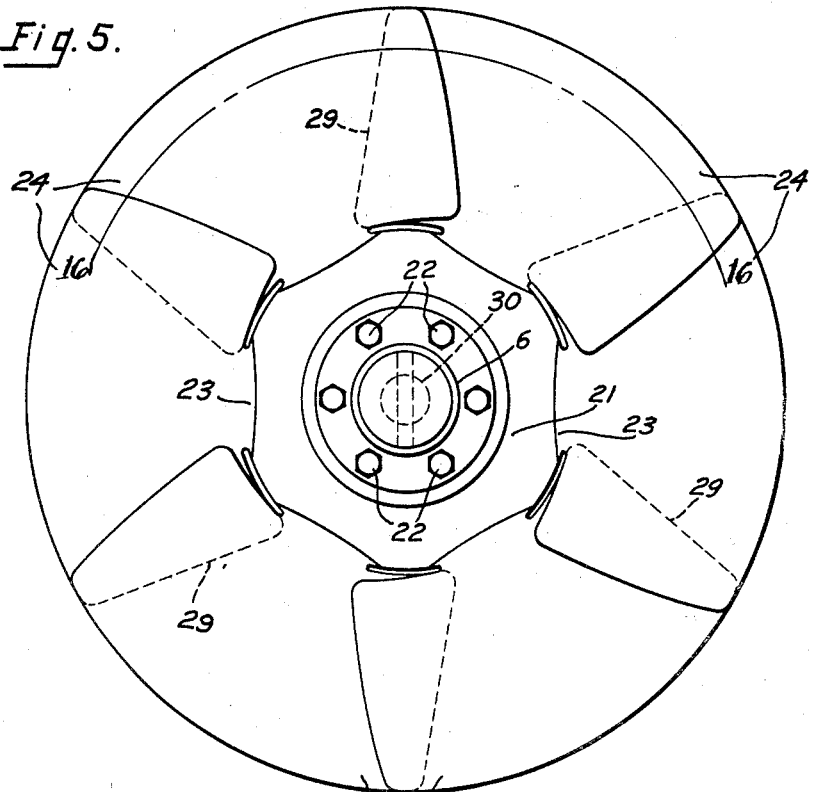
Figure 5 is a top plan view of the runner with the blades closed.
Figure 6:
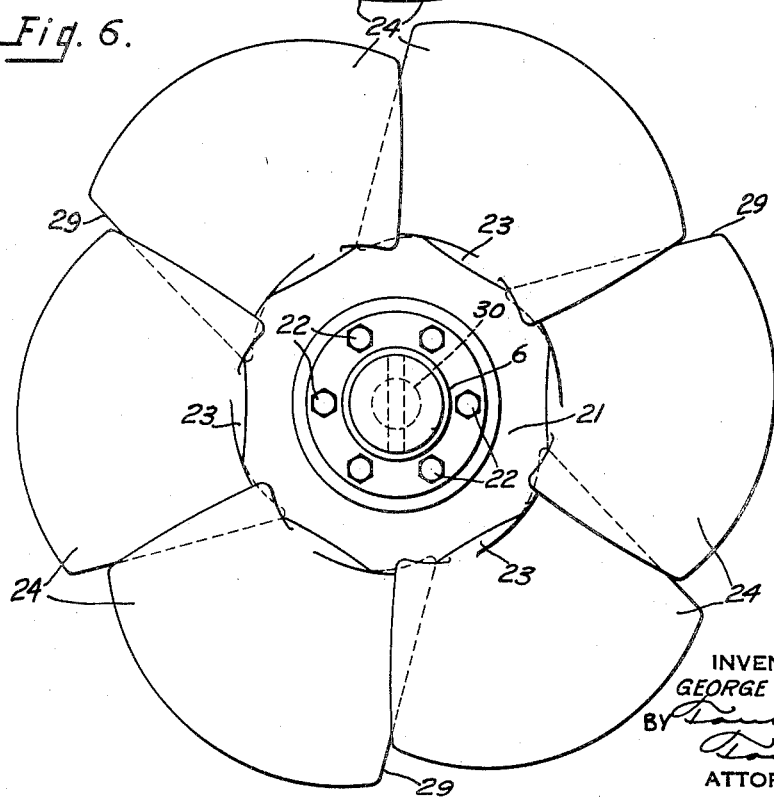
Figure 6 is a top plan view of the runner with the blades open.
Figure 8:
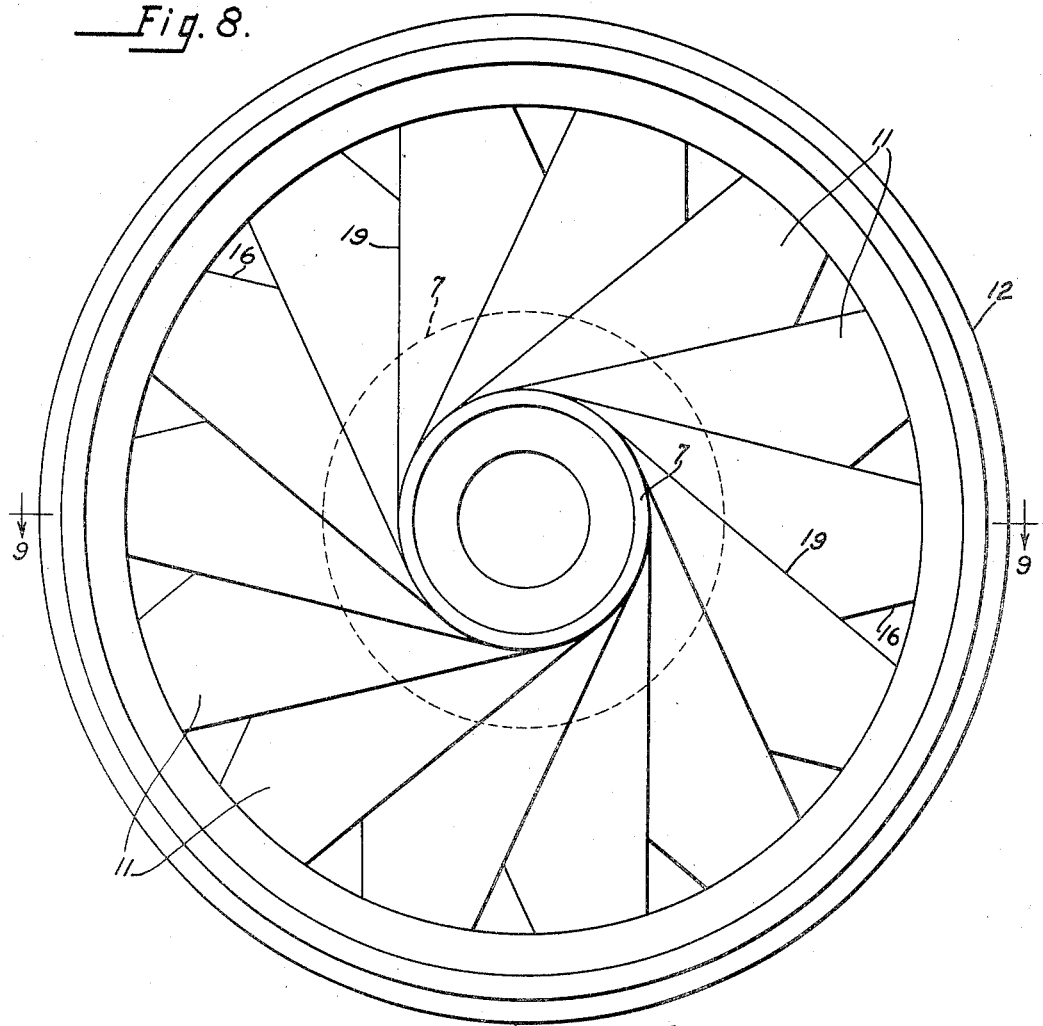
Figure 8 is a bottom plan view thereof.
Figure 9:
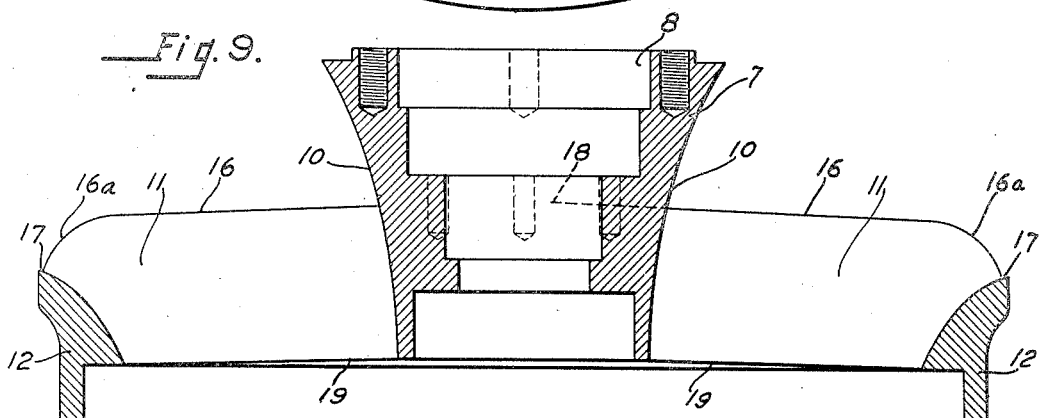
Figure 9 is a section on the line 9—9 of Figure 8.
Figure 12:
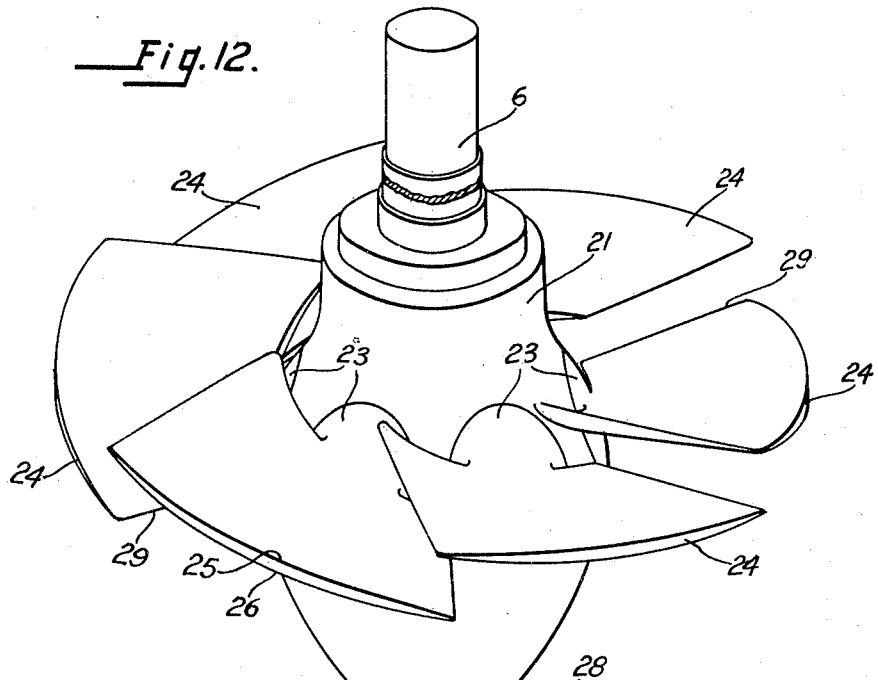
Figure 12 is a perspective of a modified runner.
Figure 13:
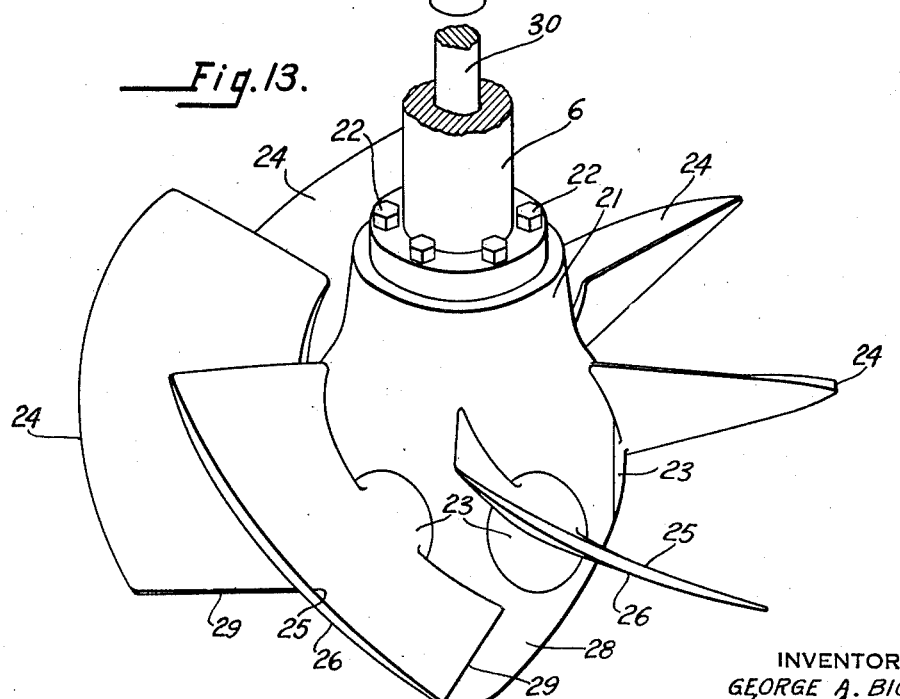
Figure 13 is a perspective of the runner shown in Figure 1 with the blades open.

Turning to the runner shown in Figures 1 and 2 it will be noted that the hub 21 is bolted by the bolts 22 to the runner shaft 6. Rotatably mounted in this hub on bucket hubs 23 are the buckets 24 which are concave on top as at 25 and convex on the bottom as at 26. Their radial axes are directed outwardly and upwardly, such as indicated at 27. The lower portion of the hub is tapered, as indicated at 28, downwardly and inwardly. These buckets are disposed, when in open position, at an angle the reverse to that of the guide vanes 11 so that the water is directed upon the faces of the buckets to cause the runner to rotate in the direction indicated by the arrow.

When these buckets are shut, all of the water is cut off from flowing therebetween. It is thus possible to adjust the flow of water without having any gates for that purpose and to eliminate the expensive and cumbersome gate rings and gate mechanism that have heretofore been necessary in connection with radial flow turbines.

In an alternative form shown in Figures 10 and 11, the axes of the bucket 27 may be horizontally disposed. The overlap of the buckets when closed is a substantially triangular area 28a. The line of juncture between the bottom of one bucket and the trailing edge of the next adjacent bucket is a straight line as indicated at 29. This provides a tight closure line to prevent the flow of water through the turbine. By this arrangement gate mechanisms are entirely eliminated.

Bucket adjusting mechanism

The buckets may be self adjusted or they may be adjusted by the operator or automatically by a governor.

Turning to Figure 14, if the bucket is to be adjusted remotely by manual or governor operation in the power house it is arranged as follows:

The shaft 30 carries ears 32 to which are linked by the links 33, the racks 34 engaging pinions 35 on the hubs 36 of the buckets of the runner. By reciprocation of the shaft 30, the buckets are adjusted as desired.

On top of the hub or ring 7 is a housing 7a which incloses part of the operating mechanism for rotating the buckets 24. In this housing and around the shaft 6 is a ring 30a, which has therein a groove for receiving the members 30b supported on the inner ends of pins 30c, suitably attached to the ends of a yoke member 30d. This yoke member is suitably attached to and operated by a shaft 30e, to which is attached one end of a lever 30f for rotation, whereby the yoke is operated to move the ring 30a up and down on the shaft 6. In this shaft is a slot 30g in which a pin 30h, attached at its ends to the ring 30a, moves up and down. This pin is attached at its center to the shaft 30. This shaft 30 is so connected to the buckets that on vertical movement thereof the buckets rotate.

When the bucket arrangement is a self-adjusting one, I employ a gear segment 37 on the shaft 36 of each bucket which engages with a gear 38 mounted on a shaft 39. Carried on this shaft are vanes 40 working in a dash pot chamber 41 formed by the enclosure 42. In this chamber formed by the wall 42 and carried by the walls are dash pot blades 43 that are stationary. The chamber is filled with oil or similar liquid. The buckets themselves are so arranged that the area A is larger than the area D and the area B is larger than the area C with respect to the axial line 27—27. This causes the buckets, when the water flow is small, to tend to shut due to the effect of the water upon the larger area A only as compared with the effect upon the smaller area C. But, when the water is sufficient to fill the entire draft tube up to the hub 28, the larger area B will be affected which will tend to open the buckets.

It will be understood that I desire to comprehend within my invention such modifications as may be necessary to adapt it to varying conditions and uses.

Having thus fully described my invention, what I claim as new and desire to secure by Letters Patent, is:

1. In combination, a draft tube, a plurality of horizontally disposed overlapping guide vanes arranged at an angle to the axis of the draft tube, a runner comprising a shaft hub with buckets thereon, said buckets being upwardly and outwardly directed and mounted below said guide vanes and arranged to overlap one another, the axes of said buckets being arranged substantially in a horizontal plane in parallelism with the axes of the guide vanes, and means remote from the buckets to rotate them.

2. In combination, a draft tube, a guide vane assembly comprising a hub, a ring and a plurality of interconnecting angularly disposed blades interconnecting said hub and ring having a convex top and a concave bottom, and a plurality of upwardly and outwardly directed runner buckets supported on a runner hub beneath said guide vanes and adjacent thereto.

3. In combination, a draft tube, a guide vane assembly comprising a hub, a ring and a plurality of interconnecting angularly disposed guide vanes interconnecting said hub and ring, each vane having a convex top and a concave bottom, and a plurality of upwardly and outwardly directed runner buckets supported on a runner hub beneath said guide vanes and adjacent thereto, said runner buckets having a concave upper surface and a convex lower surface.

4. In combination, a draft tube, a guide vane assembly comprising a hub, a ring and a plurality of interconnecting angularly disposed blades interconnecting said hub and ring having a convex top and a concave bottom, and a plurality of upwardly and outwardly directed runner buckets supported on a runner hub beneath said guide vanes and adjacent thereto, said runner buckets having a concave upper surface and a convex lower surface and so arranged as to overlap along their edges.

5. In combination, a draft tube, a guide vane assembly comprising a hub, a ring and a plurality of interconnecting angularly disposed blades interconnecting said hub and ring having a convex top and a concave bottom, a plurality of upwardly and outwardly directed runner buckets supported on a runner hub beneath said guide vanes and adjacent thereto, said runner buckets having a concave upper surface and a convex lower surface and so arranged as to overlap from periphery to hub, and means remote from the buckets to rotate the buckets.

6. In combination, a draft tube, a plurality of horizontally disposed guide vanes, the leading and trailing edges of which taper towards one another outwardly, the guide vanes being arranged in partially overlapping condition, said guide vanes being convex on top and concave on the bottom and arranged at an angle to the axial flow of water through the draft tube, a runner hub and upwardly and outwardly directed buckets mounted thereon arranged below said guide vanes, said buckets having concave upper faces and convex lower faces.

7. In combination, a draft tube, a plurality of horizontally disposed guide vanes, the leading and trailing edges of which taper towards one another outwardly, the guide vanes being arranged in partially overlapping condition, said guide vanes being convex on top and concave on the bottom and arranged at an angle to the axial flow of water through the draft tube, a runner hub and upwardly and outwardly directed buckets mounted thereon arranged below said guide vanes, said buckets having concave upper faces and convex lower faces, said buckets being arranged in overlapping condition from periphery to hub.

8. In combination, a draft tube, a hub having a face directed inwardly and downwardly located in said draft tube, and an associated spaced ring having a face extending inwardly and downwardly, a plurality of interconnecting guide vanes having arcuate upper surfaces and convex lower surfaces overlapping at least a portion of their length, and a plurality of buckets overlapping at least a portion of their length arranged therebeneath and mounted on a turbine runner hub, the surface of which is an extension of the streamline surface of the guide vane hub.

9. In combination, a draft tube, a plurality of horizontally disposed guide vanes having arcuate upper surfaces and concave lower surfaces, and a plurality of upwardly and outwardly extending adjustable runner buckets located therebeneath on horizontal axes.

10. In combination, a draft tube, a plurality of horizontally disposed guide vanes having arcuate upper surfaces and concave lower surfaces, and a plurality of adjustable runner buckets located therebeneath on horizontal axes, said buckets having concave upper surfaces and convex lower surfaces.

11. In combination, a draft tube, a plurality of guide vanes tangentially mounted on a hub overlapping one another at least a portion of their length, a ring supporting the outer ends of said guide vanes, a runner hub, and adjustable buckets mounted beneath said guide vanes, said guide vanes being arcuate on the upper surface and concave on the lower surface, and having their free ends separated from one another when viewed from above, said runner buckets being adapted to completely overlap from hub to periphery.

12. In combination, a draft tube, a plurality of transversely arranged stationary guide vanes having straight leading and trailing edges arranged on lines at an angle to the radii emanating from the center of a supporting hub, and a supporting hub, and a plurality of runner buckets arranged beneath said guide vanes having trailing edges arranged at an angle to a runner hub and leading edges coinciding with radial lines passing through said hub only when the vanes are closed.

13. In combination, a draft tube, a plurality of horizontally disposed, partially overlapping guide vanes and a hydraulic turbine runner having buckets disposed on horizontal axes therebeneath and adjacent thereto, said guide vanes having a streamline inner hub and an outer supporting ring having a curvature similar to that of the hub, and said buckets being upwardly and outwardly inclined and self-adjusting and adapted to adjust themselves as to their angularity with respect to the guide vanes according to the quantity of water flowing through the draft tube.

14. In combination, a draft tube, a guide vane assembly comprising a hub, a ring and a plurality of interconnecting angularly disposed blades interconnecting said hub and ring having a convex top and a concave bottom, and a plurality of runner buckets having horizontal axes supported on a runner hub beneath said guide vanes and adjacent thereto, said buckets having radially disposed leading edges and being self-adjusting and adapted to adjust themselves as to their angularity with respect to the guide vanes according to the quantity of water flowing through the draft tube.

15. In combination, a draft tube, a plurality of horizontally disposed, partially overlapping guide vanes, a hub supporting the inner ends of said guide vanes adjacent their overlap, a ring supporting the outer ends of said guide vanes and forming a part of the draft tube, a plurality of runner buckets arranged on horizontal axes beneath said guide vanes to receive the water passing therethrough, and a hub and shaft for supporting said runner buckets, said guide vanes being so arranged that they extend from the hub with their leading edges in a plane above the outer ring, said buckets extending upwardly and outwardly from the axes being self-adjusting and adapted to adjust themselves as to their angularity with respect to the guide vanes according to the quantity of water flowing through the draft tube.

16. In a hydraulic turbine, an unobstructed draft tube, a runner mounted therein comprising a rotatable hub and a plurality of adjustable blades adapted, when closed, to completely cut off the flow of water through the draft tube, a stationary hub supporting the rotary hub, a plurality of stationary guide vanes mounted on the draft tube and supporting the stationary hub.

17. In a hydraulic turbine, an unobstructed draft tube, a runner mounted therein comprising a rotatable hub and a plurality of adjustable blades adapted, when closed, to completely cut off the flow of water through the draft tube, a stationary hub supporting the rotary hub, a plurality of stationary guide vanes mounted on the draft tube and supporting the stationary hub, and operating mechanism carried in the stationary hub connected to the blades in the rotary hub and adapted to operate said blades.

GEORGE A. BIGGS.